United States Patent [19]

Kaufman

[11] Patent Number: 4,692,050

[45] Date of Patent: Sep. 8, 1987

[54] JOINT AND METHOD OF UTILIZING IT

[76] Inventor: Yaacov Kaufman, 17 Alexander Yanai Street, Tel Aviv, Israel

[21] Appl. No.: 776,702

[22] Filed: Sep. 16, 1985

[30] Foreign Application Priority Data

Sep. 19, 1984 [IL] Israel .................................... 73030

[51] Int. Cl.[4] ..................... F16C 11/00; F16M 11/00; F16D 1/2
[52] U.S. Cl. ......................................... 403/3; 403/52; 403/119; 403/161; 248/164; 248/97; 248/175; 267/160; 267/150
[58] Field of Search ..................... 248/164, 97, 98, 99, 248/100, 95, 150, 166, 175; 267/160, 150; 403/161, 163, 167, 168, 52, 61, 69, 70, 80, 119, 3; 16/337, 373, 369, 370

[56] References Cited

U.S. PATENT DOCUMENTS

| 607,129 | 7/1898 | Potter | 244/153 R |
|---|---|---|---|
| 874,283 | 12/1907 | Axx | 403/52 X |
| 1,904,727 | 4/1933 | Hahn | 244/153 R |
| 2,435,171 | 1/1948 | Weisz | 403/49 X |
| 2,533,570 | 12/1950 | Foy | 244/153 R |
| 2,612,414 | 9/1952 | Kirkpatrick | 403/49 |
| 2,793,028 | 5/1957 | Wheeler | 267/160 |
| 2,844,345 | 7/1958 | Sherman | 248/166 X |
| 2,957,736 | 10/1960 | Olander et al. | 248/164 |
| 2,967,035 | 1/1961 | Simons | 16/370 X |
| 3,102,721 | 10/1963 | Linville | 248/164 X |
| 3,235,038 | 2/1966 | Nesslinger | 248/166 X |
| 3,659,816 | 5/1972 | Wilson | 248/97 |
| 3,685,824 | 8/1972 | Quinn | 248/164 X |
| 3,730,572 | 5/1973 | Ballou | 403/49 |
| 4,138,139 | 2/1979 | Alfonso | 248/98 X |
| 4,169,571 | 10/1979 | Duggan | 248/166 X |
| 4,261,211 | 4/1981 | Haberland | 267/160 |
| 4,354,543 | 10/1982 | Bogner | 248/98 X |

FOREIGN PATENT DOCUMENTS

| 2461419 | 7/1976 | Fed. Rep. of Germany | 16/370 |
|---|---|---|---|
| 1370628 | 10/1974 | United Kingdom | 248/97 |
| 2055169 | 2/1981 | United Kingdom | 267/160 |

Primary Examiner—Cornelius J. Husar
Assistant Examiner—Todd G. Williams
Attorney, Agent, or Firm—Fleit, Jacobson, Cohn & Price

[57] ABSTRACT

A joint is provided which can serve for connecting two elements, but can also be employed for making a column or pole like structure. The joint consists of two superposed plates or frame shaped bodies which are interconnected by two pairs of crossing rods. The joint serves to connect two modular parts in a chain-like construction.

5 Claims, 18 Drawing Figures

JOINT AND METHOD OF UTILIZING IT

BACKGROUND OF THE INVENTION

The present invention relates to a joint and a method of utilising same and more particularly the invention relates to a multipurpose joint for use in a large variety of fields as will become apparent from the following description.

There are known several types of joints, the most common are known as universal joints which are designed to transmit rotational movement from one shaft to another in a case where the shafts are at an angular relation to one another and not co-axial. Other types of joints are usually either rigid joints or flexible joints.

SUMMARY OF THE INVENTION

The present invention relates to a different kind of joint which, though, might be flexible and which are not designed to transmit rotational movement as does a universal joint, and to a method utilising such joints.

It is the object of the present invention to provide a joint which can serve as a flexible joint as well as a rigid joint when required.

It is another object of the invention to provide a joint which is assembled of two modular parts without the need of screws or the like, thus the assembly or disassembly of same is quick and easy, saves time and labor.

Yet another object of the invention is to provide a joint from which due to its modularity, a chain like construction can be assembled forming a pole when in rigid form, or a flexible rod when in flexible form.

It is yet another object of the invention to describe a method which utilises the invention.

The joint according to the invention comprises a pair of members of geometrical outline provided with a plurality of holes, in the laterally facing surfaces of these members into which enter pivotally the bent off ends of at least two pairs of crossing rods connecting said members in a pair. The invention further comprises a method of interconnecting the said crossing rods.

BRIEF DESCRIPTION OF THE DRAWINGS

The invention will now be described with reference to the annexed drawings in which.

DESCRIPTION OF THE PREFERRED EMBODIMENTS

Figure 1:
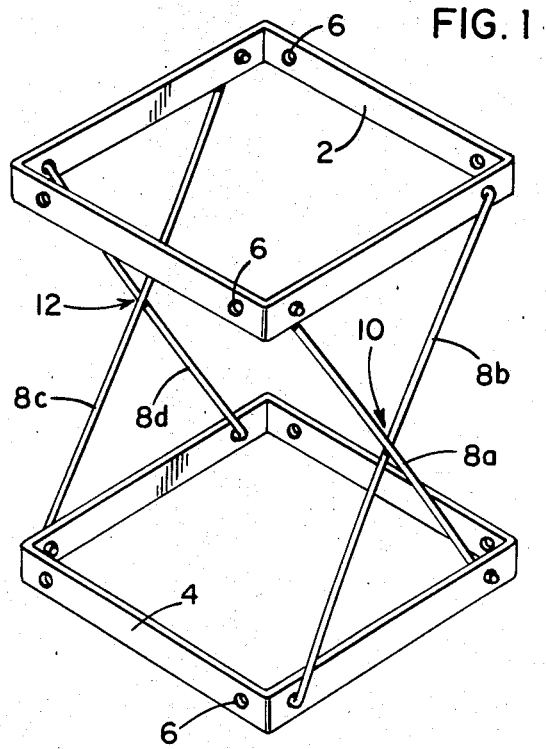
FIG. 1 is a perspective view of one embodiment of the joint.
Figure 2:
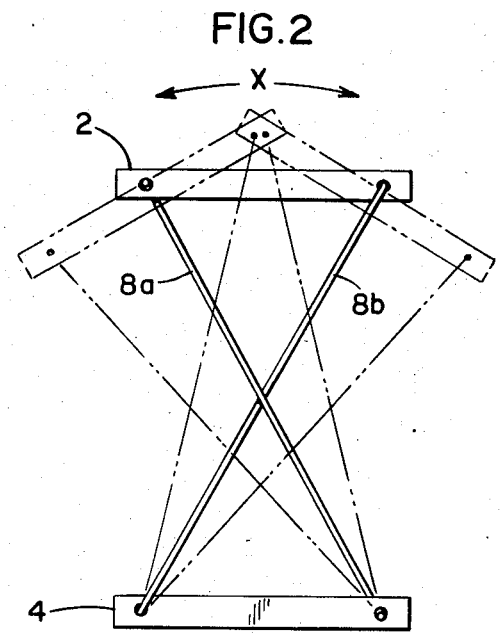
FIG. 2 is a side elevational view showing in broken lines side movement of the joint.
Figure 8:
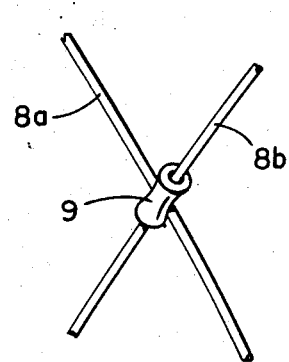
FIG. 8 illustrates the rods provided with protecting sleeves.

Turning first to FIG. 1, the joint 1 has an upper quadrangular frame shaped element 2, a lower like element 4 both of which are provided with apertures 6 in their lateral faces into which enter pivotally the end portions of crossing connecting rods 8. As can be seen in FIG. 1, a rod 8a extends over and across rod 8b, as rod 8a enters holes 6 from the inside of frame elements 2 and 4, while rod 8b enters from the outside thereof. One end of each of the two pairs of rods has both its ends extending through the holes in a direction opposite to the direction of extension through the holes of both ends of the other rod of the same pair of rods. The two rods 8a and 8b thus lock each other in the said apertures, likewise rods 8c and 8d lock each other. The rods which are made of springy material are in frictional engagement with one another at 10 and 12. As can be seen in FIG. 2, the two quadrangulars 2 and 4 move relative to each other, as indicated by arrows X. The friction between the two pairs of crossing rods 8 prevents free, undesired movement of the two elements relative to one another. If such friction is to be avoided or is not relied upon, one of the rods 8 may be provided with a sleeve 9 at the engagement point, as can be seen in FIG. 8.

Figure 3:
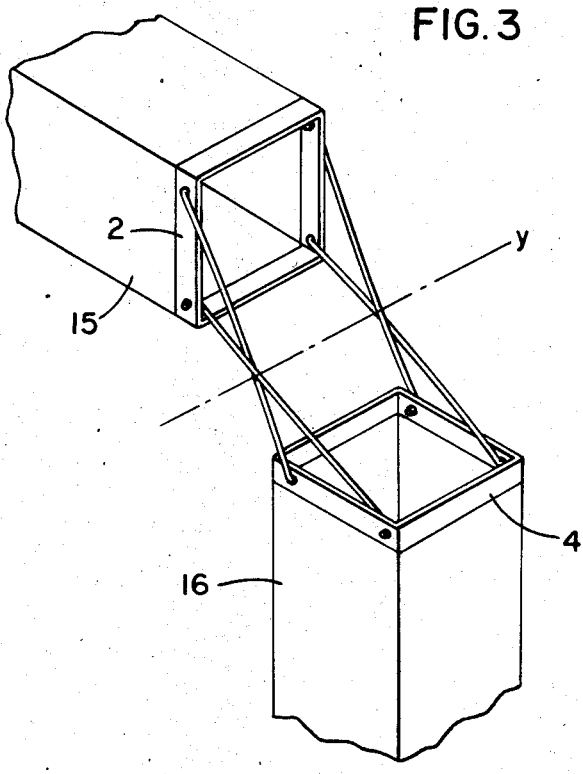
FIG. 3 shows the joint connecting two elements.

The application of such joints are practically unlimited. As can be seen in FIG. 3, the joint connects two bars 15 and 16 in such a manner as allowing a swinging movement of said two bars relative to one another about an imaginary axis 'y'. It is obvious that members 2 and 4 would have to be integral with bars 15 and 16.

Figure 4A:
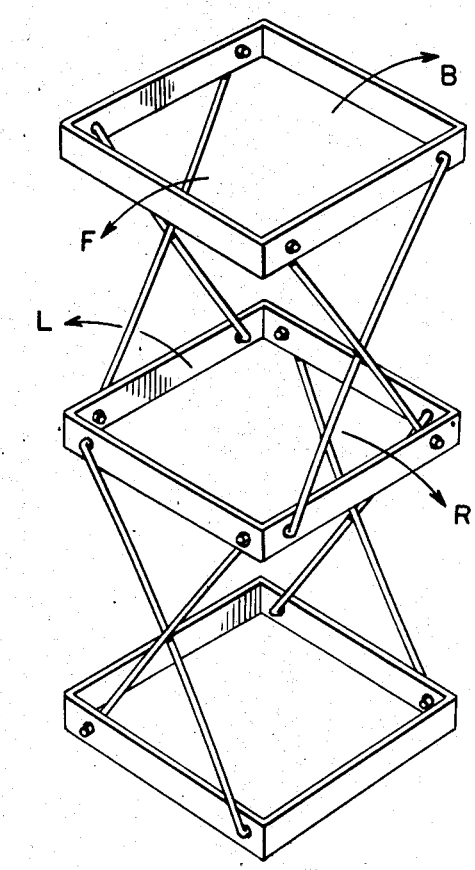
FIG. 4a shows a flexible rod connection of several joints.

A different application of the joint is illustrated in FIG. 4, there are a number of joints connected one to another forming a stack of joints. The embodiment shown in FIG. 4a is a flexible connection of the elements allowing a left (L) and right (R), back (B) and forth (F) movement of the stack as indicated by the arrows, i.e. the movement may be interpreted to a circle movement. This kind of movement is achieved by connecting the joint assemblies turned by 90° one relative to the other.

Figure 4B:
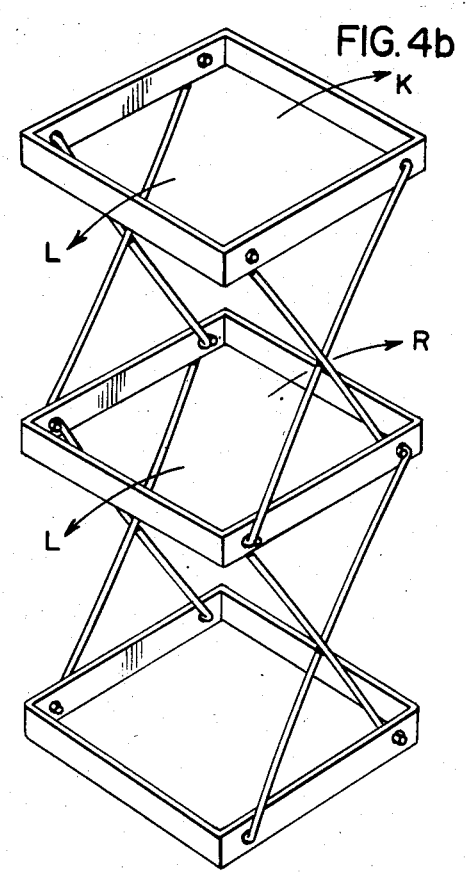
FIG. 4b shows another embodiment of a flexible connection of several joints.

The embodiment shown in FIG. 4b likewise is a flexible stack or column but with a limited movement of Left (L) and right (R) due to the fact that the joint assemblies are parallely connected.

Figure 4C:
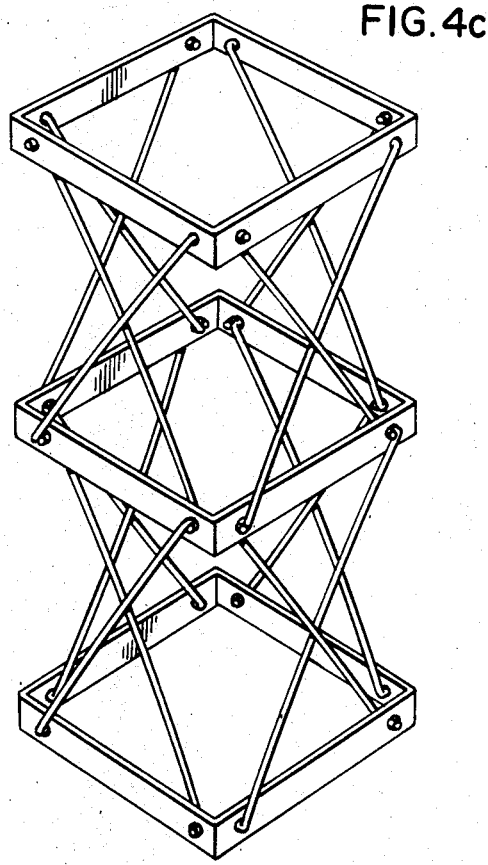
FIG. 4c shows a rigid connection of several joints forming a pole like structure.

FIG. 4c on the contrary to the other two embodiments is rigidly connected forming a pole or column. The rigidity is achieved by adding two pairs of connecting rods on each side of the joint preventing any movement.

Figure 5:
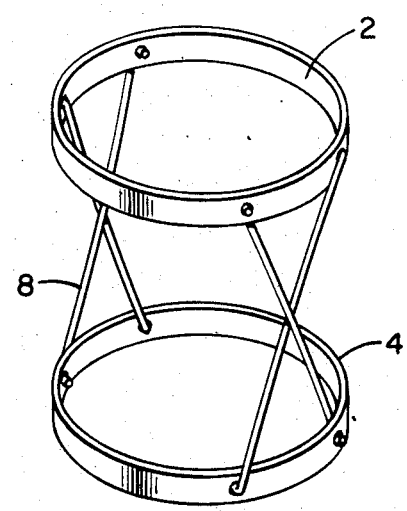
FIG. 5 is another embodiment of the joint.

FIG. 5 illustrates a joint having circular elements rather than quadrangular elements.

Figure 6:
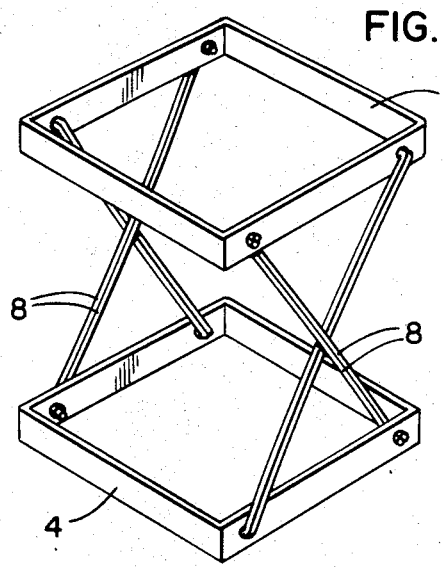
FIG. 6 is a double connected joint.

FIG. 6 illustrates a joint where double connecting rods 8 are used in such cases when special strength is required.

Figure 7A:
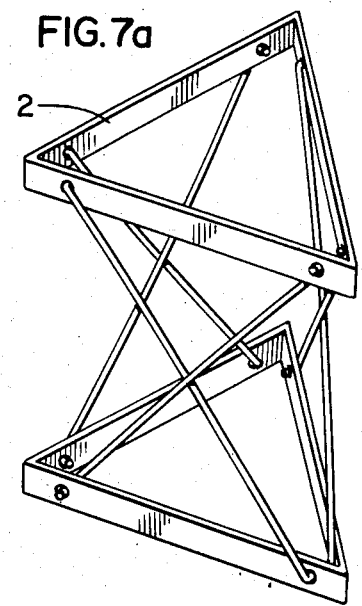
FIGS. 7a to 7d illustrate different configurations of the joint.

FIG. 7a illustrates a rigid joint having triangle elements.

Figure 7B:
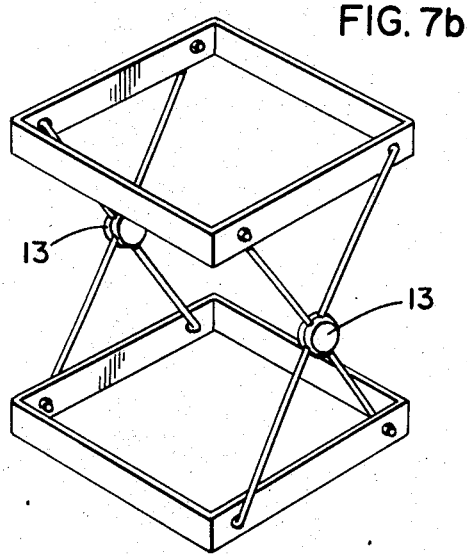

In FIG. 7b the engaging point of the connecting rods 8 is provided with a connecting member 13 which connects the two rods, immobilising them against one another, thus preventing free sliding of the rods, so securing the joint at any desired position.

Figure 7C:
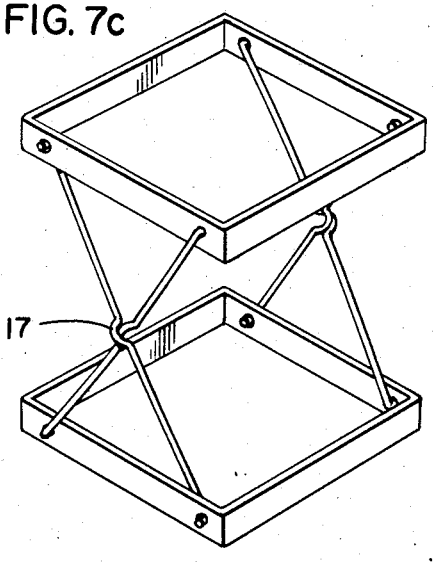

Likewise FIG. 7c illustrates another embodiment of a joint in which the cross connecting rods have a semi circular bend 17; when the bends engage one another they lock themselves in place.

Figure 7D:
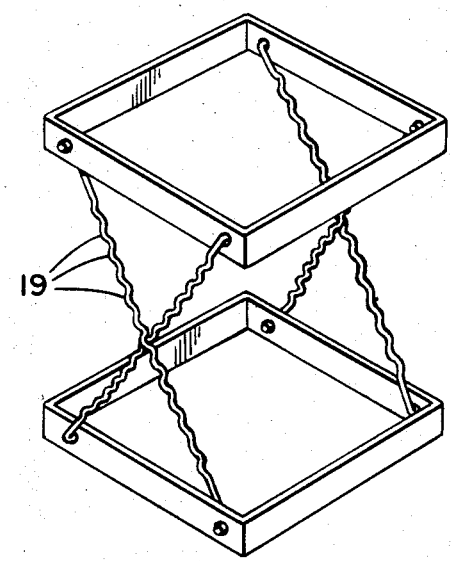

FIG. 7d illustrates yet another embodiment, rods 8 have a large number of small bends 19 which when mutually engaging prevent the free sliding of the rods thus enabling the stopping of the joint at almost any angle.

Figure 9:
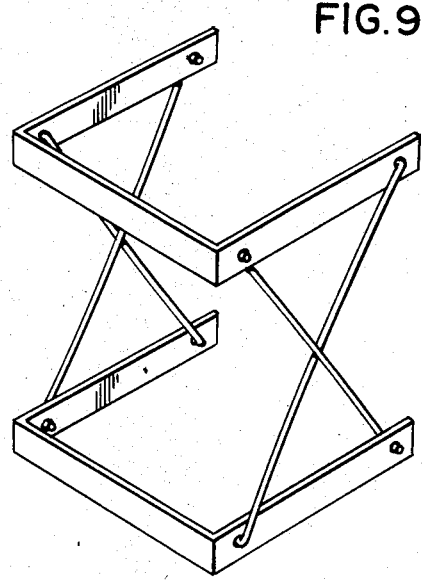
FIG. 9 shows a variation of the joint, being substantially similar to FIG. 1.
Figure 10:
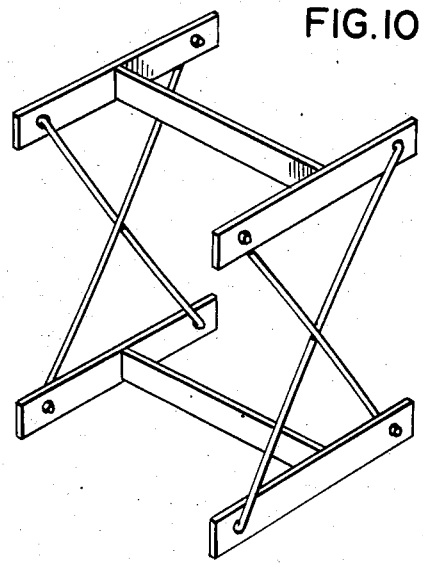
FIG. 10 is yet another variant.

According to FIG. 9, the pair of bodies which had been shown as a four sided frame are substituted by a three sided U-shaped member. Apart from that the structure of FIG. 9 is built on the lines of the structure of FIG. 1. Similarly the two top and bottom members of the structure of FIG. 10 are H shaped.

Figure 11:
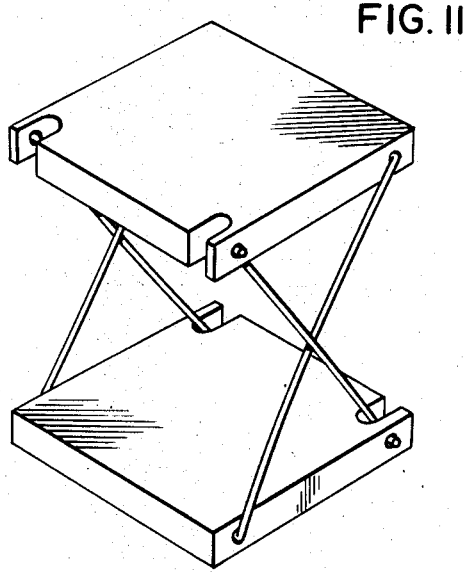
FIG. 11 illustrates the use of a pair of members of different geometrical outline.

According to FIG. 11, the two members may be solid (or hollow) plates instead of frames, apart from that the structure is built in the same way as the one of FIG. 1.

Figure 12:
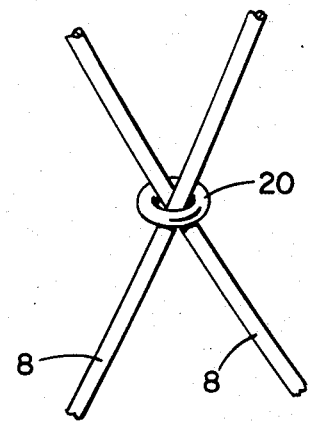
FIGS. 12 and 13 illustrate different means of interlocking means applied to the crossing rods.
Figure 13:
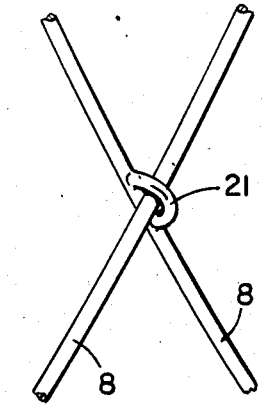

The two rods 8, according to FIG. 12 and may be connected by a ring 20. In FIG. 13, one of the rods has an integral tongue 21 which springily engages the opposite crossing rod.

The method which resides in the invention, namely, the method of connecting the elements 2 and 4 comprises the steps of entering one rod from the inside of the element while its complementary element from the outside of the element thus eliminating the use of screws, bolts or the like.

I claim:

1. A joint comprising:
   two members,
   a plurality of apertures formed in each of said two members, and
   two pairs of resilient rods positioned opposite to each other and interconnecting said two members,
   each end of each rod of said two pairs of rods being pivotably mounted in an aperture defined in a different one of said two members,
   one rod of each of said two pairs of rods having both its ends extending through said apertures in a direction opposite to the direction of extension through said apertures of both ends of the other rod of the same pair of rods, and
   each rod of each of said two pairs of rods being mounted to cross the other rod of the same pair of rods in frictional engagement, each member thereby being pivotably movable with respect to the other member and being held in a desired position by the frictional engagement of the two rods of each of said two pairs of rods.

2. The joint as claimed in claim 1, wherein said two members are quadrangular.

3. A joint as claimed in claim 1, wherein said two members are circular.

4. A joint as claimed in claim 1, wherein said two pairs of crossing rods include a bend at the end of each rod.

5. A joint as claimed in claim 1, wherein said two pairs of crossing rods include a friction eliminating sleeve.

* * * * *